(12) United States Patent
Berg et al.

(10) Patent No.: US 8,385,510 B2
(45) Date of Patent: Feb. 26, 2013

(54) METHOD FOR TRANSMISSION LINE ANALYSIS

(75) Inventors: Miguel Berg, Upplands Väsby (SE); Daniel Cederholm, Solna (SE); Klas Ericson, Älvsjö (SE); Per Ola Börjesson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 13/129,555

(22) PCT Filed: Nov. 27, 2009

(86) PCT No.: PCT/SE2009/051349
§ 371 (c)(1),
(2), (4) Date: May 16, 2011

(87) PCT Pub. No.: WO2010/064977
PCT Pub. Date: Jun. 10, 2010

(65) Prior Publication Data
US 2011/0261932 A1    Oct. 27, 2011

Related U.S. Application Data

(60) Provisional application No. 61/118,929, filed on Dec. 1, 2008.

(51) Int. Cl.
*H04M 1/24*    (2006.01)
*H04M 3/08*    (2006.01)
*H04M 3/22*    (2006.01)

(52) U.S. Cl. ..... 379/1.04; 379/1.03; 379/24; 379/27.03; 375/224

(58) Field of Classification Search ............... 379/1.01, 379/1.03, 1.04, 9, 10.01, 15.01, 24, 27.01, 379/27.03, 29.01; 370/241, 242, 247, 249, 370/251, 252; 375/224, 227, 228
See application file for complete search history.

(56) References Cited

U.S. PATENT DOCUMENTS
2004/0101130 A1*    5/2004    Shi et al. ............... 379/399.01
(Continued)

FOREIGN PATENT DOCUMENTS
WO    WO 2006/081484 A2    8/2006
WO    WO 2006081484 A2 *    8/2006

OTHER PUBLICATIONS

International Search Report, PCT Application No. PCT/SE2009/051349, Mar. 30, 2010.

(Continued)

*Primary Examiner* — Binh Tieu
(74) *Attorney, Agent, or Firm* — Myers Bigel Sibley & Sajovec, P.A.

(57) ABSTRACT

A FDR SELT measurement is made in a stop band of a DSL band plan, using a PSD allowed by the PSD mask. Further measurements may also be made in an adjacent pass band and further bands, and the results combined to create a wide-band measurement result. When transformed into the time domain (e.g. by inverse Fourier transform to produce the line impulse response) greater resolution in time (and hence greater spatial resolution) is achieved. In order to compensate for AGC calibration errors measurements using different AGC steps may be scaled to fit smoothly to each other. If measurements overlap, measurement results in the region of overlap may be combined in various ways to limit the influence of noise and to create a smooth transition from one measurement to the next.

14 Claims, 10 Drawing Sheets

U.S. PATENT DOCUMENTS

2009/0161741 A1* 6/2009 Ginis et al. .................. 375/224
2010/0296633 A1* 11/2010 Lindqvist et al. .......... 379/27.01

OTHER PUBLICATIONS

Written Opinion of the International Searching Authority, PCT Application No. PCT/SE2009/051349, Mar. 30, 2010.

International Preliminary Report on Patentability, PCT Application No. PCT/SE2009/051349, Oct. 28, 2010.
International Telecommunications Union, ITU-T Recommendation G.993.2, "Very high speed digital subscriber line transceivers 2 (VDSL2)", *Series G: Transmission Systems and Media, Digital Systems and Networks, Digital sections and digital line system—Access networks*, Feb. 2006.

* cited by examiner

METHOD FOR TRANSMISSION LINE ANALYSIS

CROSS REFERENCE TO RELATED APPLICATIONS

This application is a 35 U.S.C. §371 national stage application of PCT International Application No. PCT/SE2009/051349, filed on 27 Nov. 2009, which itself claims priority to U.S. provisional patent Application No. 61/118,929, filed 1 Dec. 2008, the disclosure and content of all of which are incorporated by reference herein in their entirety. The above-referenced PCT International Application was published in the English language as International Publication No. WO 2010/064977 A1 on 10 Jun. 2010.

TECHNICAL FIELD OF THE INVENTION

The present invention relates to the field of transmission line analysis.

BACKGROUND

In DSL (Digital Subscriber Line) technology, such as VDSL2, the use of the spectrum available for the service is governed by a band plan, which is usually part of the standard. The plan specifies, for each end of the loop, which bands (frequency intervals) are intended to be used for transmission (pass bands) and which may not (stop bands). A PSD (Power Spectral Density) mask specifies the permitted transmit power for the bands.

Normally, some bands, upstream bands, are reserved for transmission by the CPE (Customer Premises Equipment), whereas other bands, downstream bands, are reserved for transmission by the DSLAM (Digital Subscriber Line Access Multiplexer) at the central office. Thus, a band which is a passband in the band plan for one end of the loop will be a stop band in the band plan for the other end of the loop.

There may be bands which are not intended for transmission at all (e.g. they are stop bands in the band plan for the central office end as well as being stop bands also in the band plan for the customer end). This may be to prevent interference with other systems.

Different band plans may be used depending on the setting, i.e. the circumstances and the location on the loop where transmission takes place. E.g. the PSD masks are (naturally) different for the customer and central office ends of the loop, but may also be different for different applications, such as fiber-fed cabinets near the customer end as opposed to copper connection all the way between customer and central office. Band plans and PSD masks may also differ between different markets or operators depending on regulatory requirements designed to limit interference to/from other equipment.

In general, it is not possible to design a transmitter to be absolutely quiet (i.e. to transmit no power at all) in some frequency bands while transmitting at normal power in others. In particular, when transmitting in a pass band at normal transmit power there will always be side lobes and intermodulation products in the adjacent stop bands, i.e. a leakage of power into the bands not intended for transmission. For this reason, the PSD masks allow a certain small transmit power also in the stop bands.

Single Ended Line Testing, SELT, is a method for testing a transmission line (loop) which requires actions at one end of the line only. Typically a signal of some kind is sent to the line and a resulting signal, such as an echo is received. From the relationship between the sent and the received signal, information about the line and its properties may be deduced.

In TDR (Time Domain Reflectometry) SELT, a brief pulse is sent to the line. The resulting echo as a function of time is recorded. Defects in the line may be seen as peaks in the echo curve, and the position in time on the curve gives information about where on the line the defect is located.

FDR (Frequency Domain Reflectometry) SELT is a method wherein a more or less stationary signal covering many frequencies is applied to the line for a certain time. The resulting reflected signal as a function of frequency, is recorded (i.e. amplitude and phase as a function of frequency).

The received signal as a function of frequency is then divided by the sent signal as a function of frequency, to get an echo frequency response. Various adjustments and other manipulations can be made in order to represent different line properties. By use of the inverse Fourier transform, the impulse response of the line may be generated mathematically.

When making a measurement, there is often a desire for greater accuracy, to be able to better resolve the location and other characteristics of faults and other line artifacts.

EP 1 111 808 A1 describes a TDR (Time Domain Reflectometry) method wherein specially designed edge regions of TDR pulses makes it possible to add the corresponding time domain echoes to produce a wideband impulse response measurement. This allegedly solves the problem of how to detect more than just the first defect on a line.

ITU-T standards G.993.2 and G.992.5 describe the VDSL2 and ADSL2+ standards respectively.

SUMMARY OF THE INVENTION

When making a FDR SELT measurement on a DSL line intended for a technology such as VDSL2, a signal may be sent in one of the pass bands and the resulting signal received.

For better accuracy, it is desirable to make the measurement with a strong signal and a large bandwidth. However, the transmit bandwidth and signal power are limited by the band plan and associated PSD masks.

Certain advantages may be achieved by transmitting in the bands not intended for transmission (the stop bands), contrary to the intention of the standard, while still keeping the transmit PSD in accordance or substantially in accordance with the standard.

The PSD being substantially according to the standard in this context means that the power may exceed the PSD mask limit somewhat, but is still low enough as not to cause unacceptable interference to e.g. other systems, and still very much lower than the PSD levels allowed in pass bands and used for regular transmission.

In some band plans, there may be a stop band which is significantly wider than any of the pass bands. For example, in some VDSL2 band plans, the spectrum from 8 to 30 MHz is intended neither for downstream nor upstream transmission, in order to protect against unacceptable interference to other systems.

By transmitting the FDR SELT test signal in such a band, using a PSD that complies or at least substantially complies with the PSD mask, a measurement can be made which has a greater bandwidth than if a pass band had been used while still not creating unacceptable interference. A greater bandwidth gives improved resolution when line properties in the time domain are to be estimated.

Since the signal (and hence the echo) is quite weak, the Signal to Noise Ratio (SNR) will not be as good as when transmitting a stronger signal in a pass band, where much stronger signals are allowed according to the PSD mask. This disadvantage may be at least in part compensated for by sending the signal during a longer time (and averaging the echo in order to improve SNR).

The signal is preferably as strong as the PSD mask allows to get as good SNR as possible, but if other circumstances require it, a weaker signal may of course be used.

Combining measurements in different bands is a further way to improve resolution in the time domain. However, simply transmitting with the maximum allowed PSD in all pass bands and then combining these measurement results will give rise to side lobes in the time domain because of the gaps in the measurement caused by the stop bands. A measurement over a contiguous frequency band would have been desired.

Instead of a normal contiguous measurement over a wide range of frequencies (which would either be all low power, or else violate the PSD mask of the stop band parts of the range), measurements may be made in the different bands preferably using the maximum allowed PSDs of the particular bands, and those results then concatenated in the frequency domain.

At least a measurement in a stop band and a measurement in an adjacent pass band are desired, the results of which may be concatenated.

Compared to a measurement on only one pass band, or concatenated measurements in several pass bands (i.e. non-contiguous), such a measurement has a higher noise level, but much better time resolution.

The result of a measurement in a band is usually expressed as an echo function in the frequency domain, i.e. the quotient between the received and the sent signal as a function of frequency. In principle, the quotient is not affected by the used PSD, and hence results may be combined directly.

If the AGC level of the receiver is not precisely known, the measurement results from different bands may not fit perfectly to each other at the band edges, which may give rise to side lobes that may decrease the time resolution of the combined measurement.

This may be addressed by various adjustment techniques. For example, the measurement signal for a stop band may be made a little wider than the band, so as to extend a little into the respective pass bands. The measurements may then be scaled, to achieve best fit in the region of overlap. The pass band measurement result and the stop band measurement result in the region of overlap may then be further adapted to fit precisely to each other.

Another approach is to make a measurement over a wide frequency range (e.g. the entire range supported by the transceiver) at low power (e.g. stop band levels), then make high power measurements in the pass bands. Each of the pass band measurement results can then be scaled so as to achieve a best fit to the wideband measurement results for frequencies that they have in common. A combined result can then be made from the high power pass band results and the stop band parts of the wideband result.

It is an advantage of the invention that increased time and/or spatial resolution may be achieved.

A further advantage is that higher resolution measurements may be made without serious interference with other systems or lines.

Another advantage is that higher resolution measurements can be made without violating standards requirements.

Yet another advantage is that except for the PSD limits of the applicable PSD mask, there are no special requirements on the shape of the PSD curve of the sent signal, at band edges or otherwise.

Still an advantage is that the sent signal can be a more or less stationary signal and noise reduction by averaging over time is easily implemented.

A further advantage is that measurements can be made by a standard DSL transceiver. Metallic access for special test equipment is not needed.

DETAILED DESCRIPTION OF EMBODIMENTS

Figure 1:
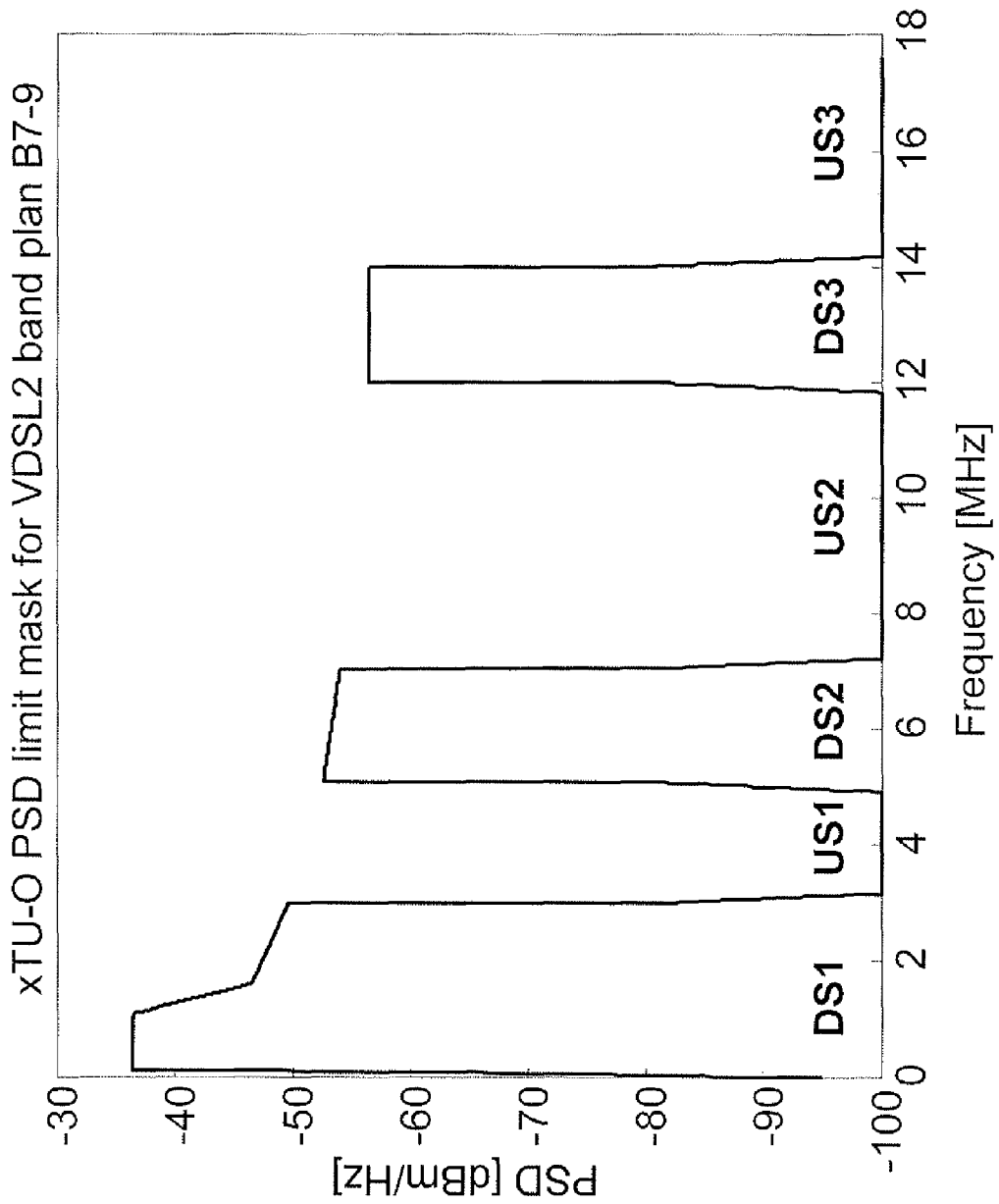
FIG. 1 shows the PSD mask of a VDSL2 band plan.

Single Ended Line Test (SELT) tools utilizing noise and echo measurements can be very powerful in diagnosing problems that prohibit or severely disturb communication in a telecommunication system. High-resolution results require a wide measurement bandwidth and in order to achieve good Signal-to-Noise Ratio, a high transmit Power Spectral Density (PSD) is desired in order to keep measurement time down. However, SELT tools in principle need to comply with the same band plans and PSD masks as used for normal operation of the systems.

Usually, regional regulatory PSD masks also exist in addition to the DSL band plans, in order to ensure compatibility between multiple communication standards (e.g. both ADSL2 Annex A and M) present in the same access network. No system is allowed to violate the regulatory limits while one system can violate another system's standard band plan and PSD mask if allowed by the regulatory limits.

These PSD masks are needed to:
- limit Far-End Crosstalk (FEXT) levels, thus protecting communication on neighbor lines (e.g. same or other DSL flavors, POTS, ISDN)
- limit Near-End Crosstalk (NEXT) levels when transmit and receive bands are overlapping (common problem with echo-cancelled systems and when different systems are mixed in the same cable binder)
- limit out-of-band emissions such as sidelobes and intermodulation products from the transmit band leaking into the receive band (primarily for frequency division duplexing systems)

For DSL technologies, the PSD limit mask specifies the maximum PSD both for the transmit bands and for the receive bands (spectral leakage). This mask is separate for xTU-R and xTU-O side. Existing ADSL SELT tools are intended for Central Office (CO) deployment and typically use a flat PSD at about −40 dBm/Hz since a flat PSD simplifies the measurement and analysis.

Such a signal violates the CO-side ADSL PSD limit mask regarding the upstream (stopband) and may cause bit errors on upstream of neighbor lines. It may however still be allowed according to regulatory limits since there are other systems that use this spectrum but this approach is not always feasible and definitely not for higher frequencies, e.g. for VDSL2 upstream bands other than US0.

Since the dynamic range of a communication receiver is limited by the effective number of bits in the Analog-to-Digital converter, an Automatic Gain Control (AGC) is often used to adapt the input signal to a level which best utilizes the dynamic range.

Time resolution is inversely proportional to the measurement bandwidth, which implies that, in order to achieve high resolution, measurements should be performed over a large bandwidth. However, when using a wideband signal for time-domain analysis, it is important not to have gaps in the frequency domain, i.e. non-measured frequencies within the band. These gaps can be seen like multiplication with a rectangular window which in time-domain translates to convolution with a sinc function ($sinc(x) \equiv sin(nx)/(nx)$). Such a convolution causes excessive "ringing" due to the high sidelobe level of the sinc function and sidelobes from a strong echo can hide the main lobe of a weaker echo. Apart from gaps, any type of step or rapid change of slope in the frequency domain will cause similar effects.

A problem in e.g. VDSL2 is that the transmission band is split into multiple bands separated by receive bands (transmission gaps). Although typical VDSL2 transceivers are capable of 17 or 30 MHz bandwidth, limiting e.g. FDR Single-Ended-Line-Test (SELT) to only the first downstream band (DS1) in a VDSL2 DSLAM would usually mean a measurement bandwidth of less than 3 MHz, i.e. not much more than the 2.2 MHz available for ADSL2+. The achieved resolution will in this case be less than 20% (3 MHz/17 MHz) of the attainable resolution. Using another downstream band (e.g. DS2, DS3) instead of DS1 can give slightly better time resolution if the used band is wider but the improvement is marginal and the attenuation will increase due to the higher frequency, leading to reduced SNR. Using multiple downstream bands together in a time domain analysis of a FDR measurement result is also not trivial due to the frequency gaps mentioned above.

(However, a frequency domain approach could still be used, e.g. adapting parameters in a model of a transmission line (with/without faults) to the measurement results of the measured frequency bands.)

A further problem is that when a wideband FDR echo measurement is performed by concatenating multiple measurements, different AGC settings may apply in the receiver, leading to discontinuities in the concatenated signal if the AGC gain steps are not perfectly known. This will create effects similar to the frequency domain gaps albeit usually not as severe.

The problems can be solved by performing multiple FDR echo measurements, even on bands not intended for transmission, using different (overlapping or adjacent) parts of the available spectrum and using PSD levels that do not violate applicable PSD limits. These measurements are then scaled properly, to ensure a continuous echo at band edges, and concatenated to form a wideband echo measurement with high resolution and low sidelobe levels in the time domain. If necessary, repeated measurements are performed and averaged in order to improve the SNR.

Although a modem is not supposed to transmit on the receive bands or other bands outside the intended transmission bands, a certain transmit PSD level must be allowed in those bands (stopbands) due to spectral leakage from the transmit bands (passbands) as mentioned in above. If the transmit PSD is kept below the limit, it should be possible to transmit in the receive bands without disturbing neighbor lines. Of course, the SNR will typically be much lower than for transmit bands.

PSD limits outside the intended transmission bands in VDSL2 are typically about −100 dBm/Hz and sometimes even lower but with sufficiently long measurement time, a useful echo can still be acquired.

As an example, FIG. 1 shows VDSL2 band plan B7-9 [G.993.2, Amendment 1].

It has three downstream bands (DS1-DS3) and four upstream bands (US0-US3) where the lowest (US0: 25-138 kHz) is not visible in the figure since it is too narrow for the used frequency scale.

The widest transmission band is DS1, which is about 3 MHz wide.

Some ADSL SELT implementations already today transmit on the ADSL upstream frequencies with the same flat PSD as for downstream frequencies (e.g. −40 dBm/Hz). This means that they actually violate the ADSL downstream PSD mask but this is possible in some telecommunication networks since operators usually have other systems like ISDN and SHDSL generating crosstalk at these frequencies and crosstalk coupling is low. However, this approach is not always feasible and definitely not for higher frequencies, e.g. for VDSL2 upstream bands other than US0.

In this invention, gaps in frequency when performing normal FDR echo measurements on transmit bands can be mitigated by also performing echo measurements on the receive bands, using the PSD limits intended for spectral leakage. In principle, transmit and receive bands could be measured simultaneously (e.g. with a single test signal where the power is much higher in the pass bands than in the stop bands, for example several orders of magnitude higher), however in order to best utilize the dynamic range of the transceiver (and not to violate receive band PSD masks due to the combination of transmitted signal and spectral leakage from neighbor bands), receive and transmit band measurements are preferably performed separately. Also, with simultaneous measurement, spectral leakage from the stronger passband signal will interfere with the weaker signal in the stopband, reducing the already low SNR further.

Figure 2:
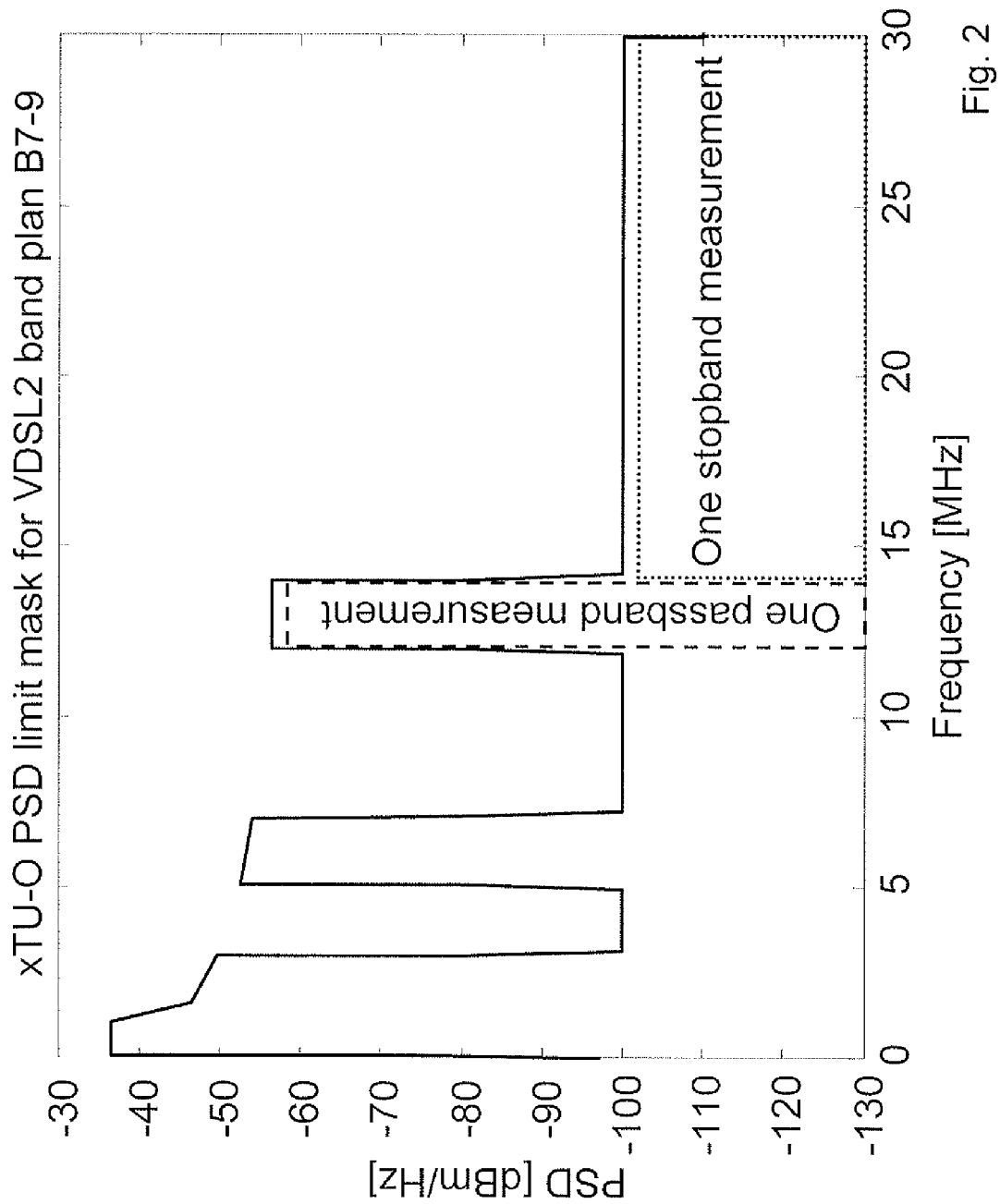
FIG. 2 shows an example of PSDs of echo measurements in non-overlapping but adjacent bands (one stopband and one passband).

An example of this is shown in FIG. 2 which shows echo measurements in non-overlapping but adjacent bands. Here, one stopband and one passband is measured. In the shown example, it would also be possible to measure over all frequencies with a PSD of −100 dBm/Hz and then measure again with a higher PSD in the passbands.

Figure 3:
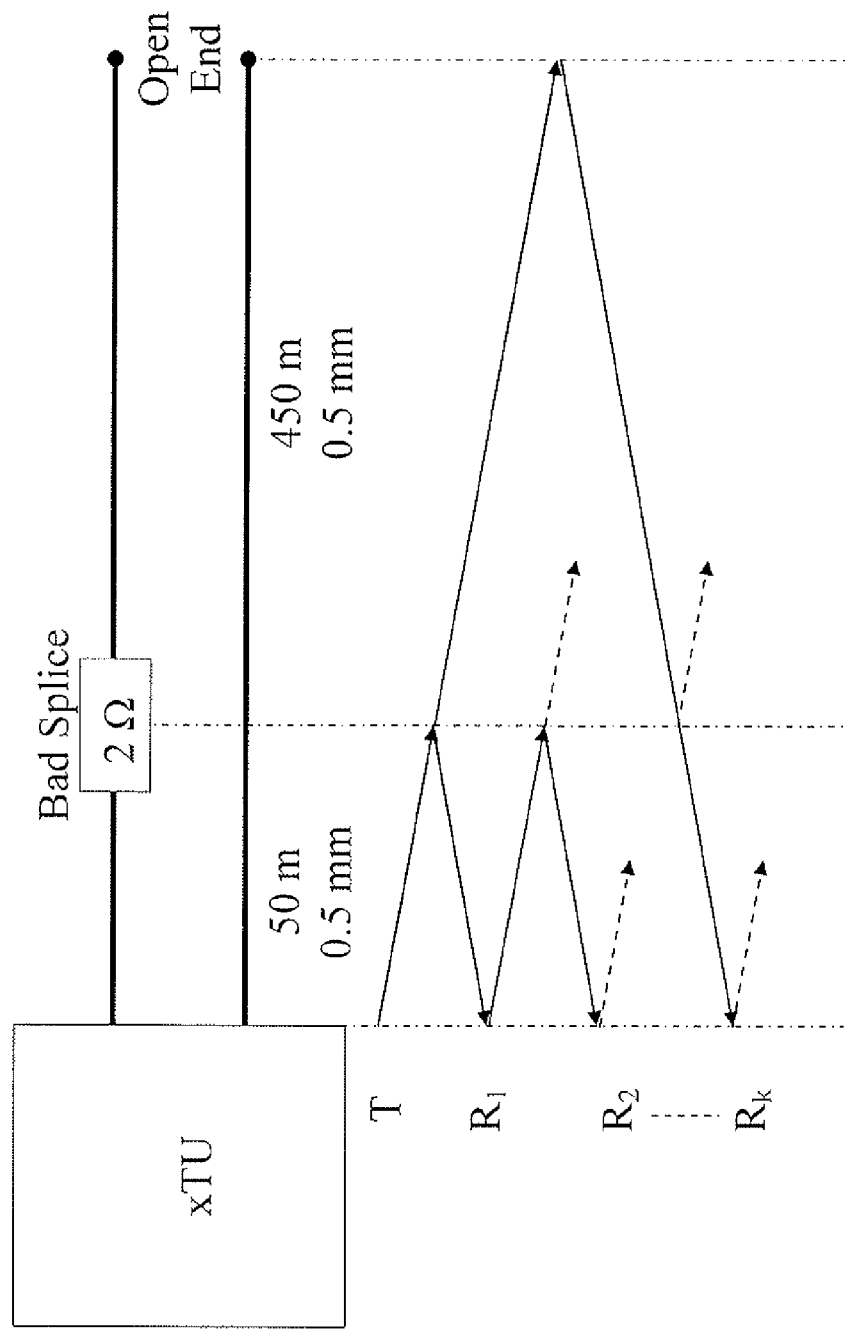
FIG. 3 shows a setup to simulate a SELT measurement on a 500 meter long cable with a bad splice (2 ohm series resistance) at 50 meter from the xTU. The figure also shows a signal graph showing the transmitted signal (T) and some of the received reflections (Ri).

In order to illustrate the enhanced resolution achieved with the current invention, a simulation was performed with a FDR SELT measurement on a 500 meter long ETSI 0.5 mm cable with a bad cable splice (2 ohm series resistance) at 50 meters from the xTU, as shown in FIG. 3.

FIG. 3 also shows a signal graph showing the transmitted signal (T) and some of the received reflections (Ri).

A frequency domain echo U(f) is calculated as:

$$U(f) = \frac{R(f)}{T(f)}, R(f) = \sum_i R_i(f)$$

where R(f) is the received signal and T(f) is the transmitted signal. By dividing the received signal R(f) with the transmitted signal T(f), the echo will in principle not be affected by the used PSD and hence the large PSD difference in FIG. 2 is compensated for automatically. As shown in FIG. 3, the received signal is a sum of several different components $R_1(f)$ with different delays depending on the traveled path from transmitter to receiver. Further, since T(f) contains the transmit PSD level, the resulting echo should ideally be independent of the used PSD curve apart from SNR, which will be proportional to the PSD. The uncalibrated echo frequency response U(f) is then corrected for any (linear) distortion in the transceiver in order to get a calibrated echo response or input return loss $S_{11}(f)$. This calibration procedure is already described in WO 2004/100512 A1 (U.S. Pat. No. 7,069,165, EP-1625735) and will not be repeated here. Further, in order to get a time-domain echo response, $s_{11}(t)$, the return loss $S_{11}(f)$ is filtered, e.g. by multiplication with a suitable window function such as a Kaiser window, and then an inverse Discrete Fourier Transform is applied. By performing the substitution $$t = \frac{2d}{v}, d = \text{distance and } v = \text{velocity of propagation}$$

we get an approximation for an echo vs. distance function $$s'_{11}(d) = s_{11}\left(\frac{2d}{v}\right).$$

Figure 4:
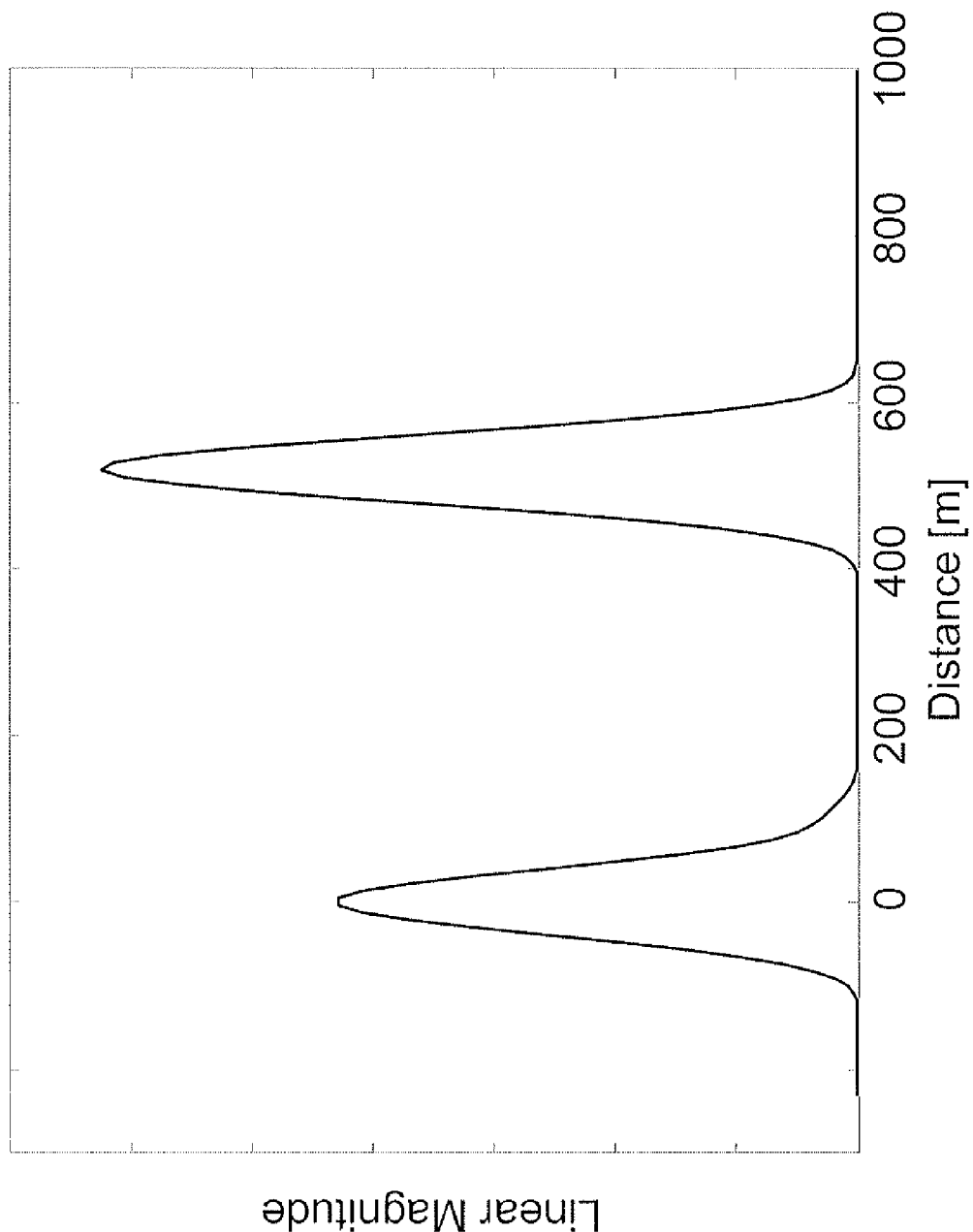
FIG. 4 shows a graph of echo vs. distance using only band DS1.

Using an echo measurement in band DS1 with the PSD shown in FIG. 1 when performing an echo measurement gives an $s'_{11}(d)$ result which does not reveal the existence of the bad splice since the reflection is drowned by the stronger echo from the impedance discontinuity between the DSLAM and the cable. This is displayed in FIG. 4 which shows Echo vs. distance using only band DS1 (approx 3 MHz). The bad splice at 50 meter distance cannot be resolved due to the mainlobe width of the near-end echo.

Figure 5:
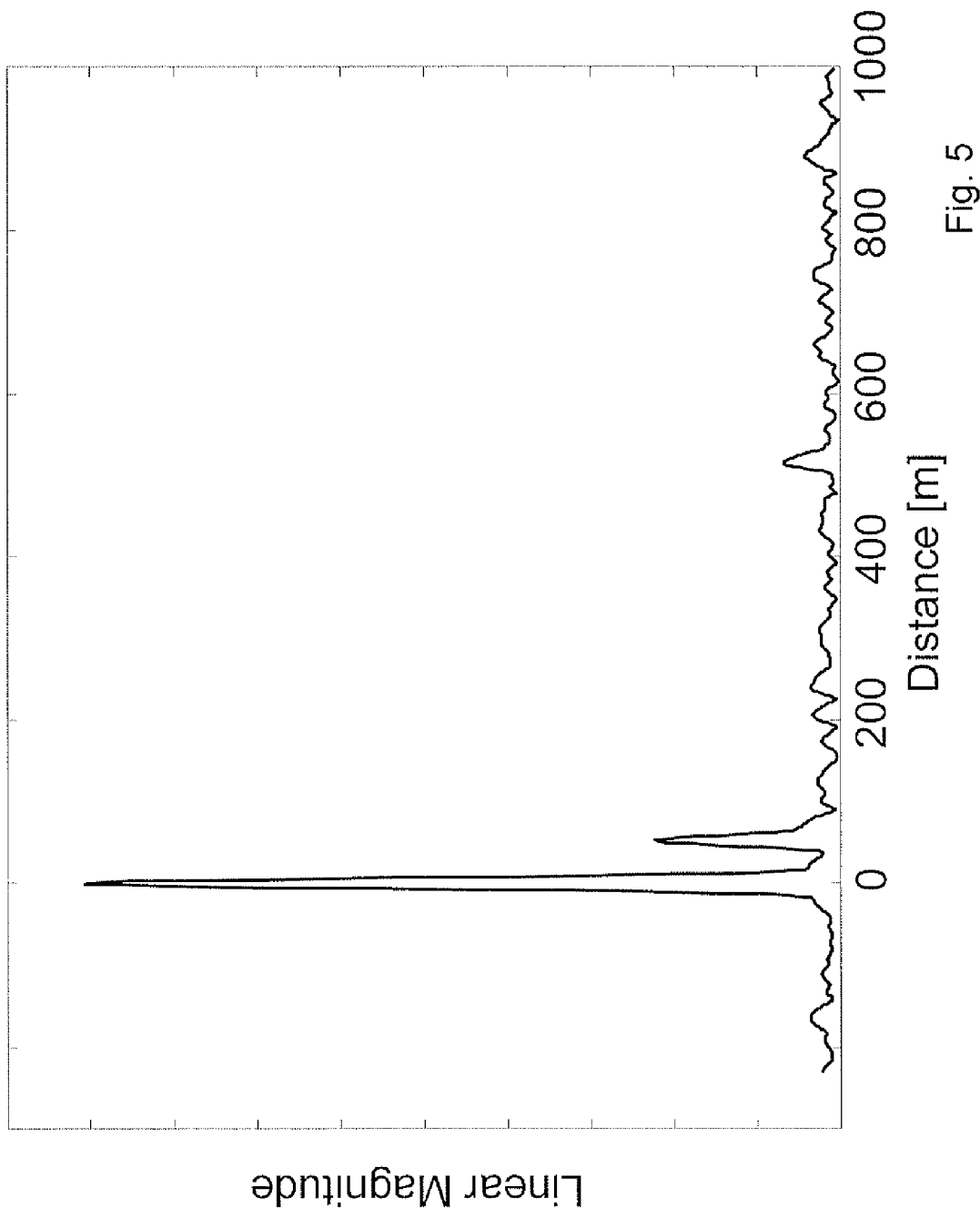
FIG. 5 shows a graph of echo vs. distance using the whole 17 MHz band including measurements in receive bands.

However, when performing echo measurement with the full 17 MHz band and the PSD levels from FIG. 1, the bad splice at 50 meter distance is seen clearly as displayed in FIG. 5. The figure shows echo vs. distance using the whole 17 MHz band including measurements on receive bands.

The far-end echo at 500 meter has become much weaker due to the strong attenuation of the wideband signal. Also, the noise floor has increased dramatically due to the much lower SNR in the receive bands. Still, the multiband signal is very useful to detect problems close to the transmitter. Also, the noise floor in the multiband method could be lowered to some extent by filtering. This filtering does not have to be applied to all bands; it can be beneficial for the wanted signal to only filter the noisiest bands, which typically would be the receive bands. This would allow reducing noise while still keeping most of the increased resolution.

Figure 6:
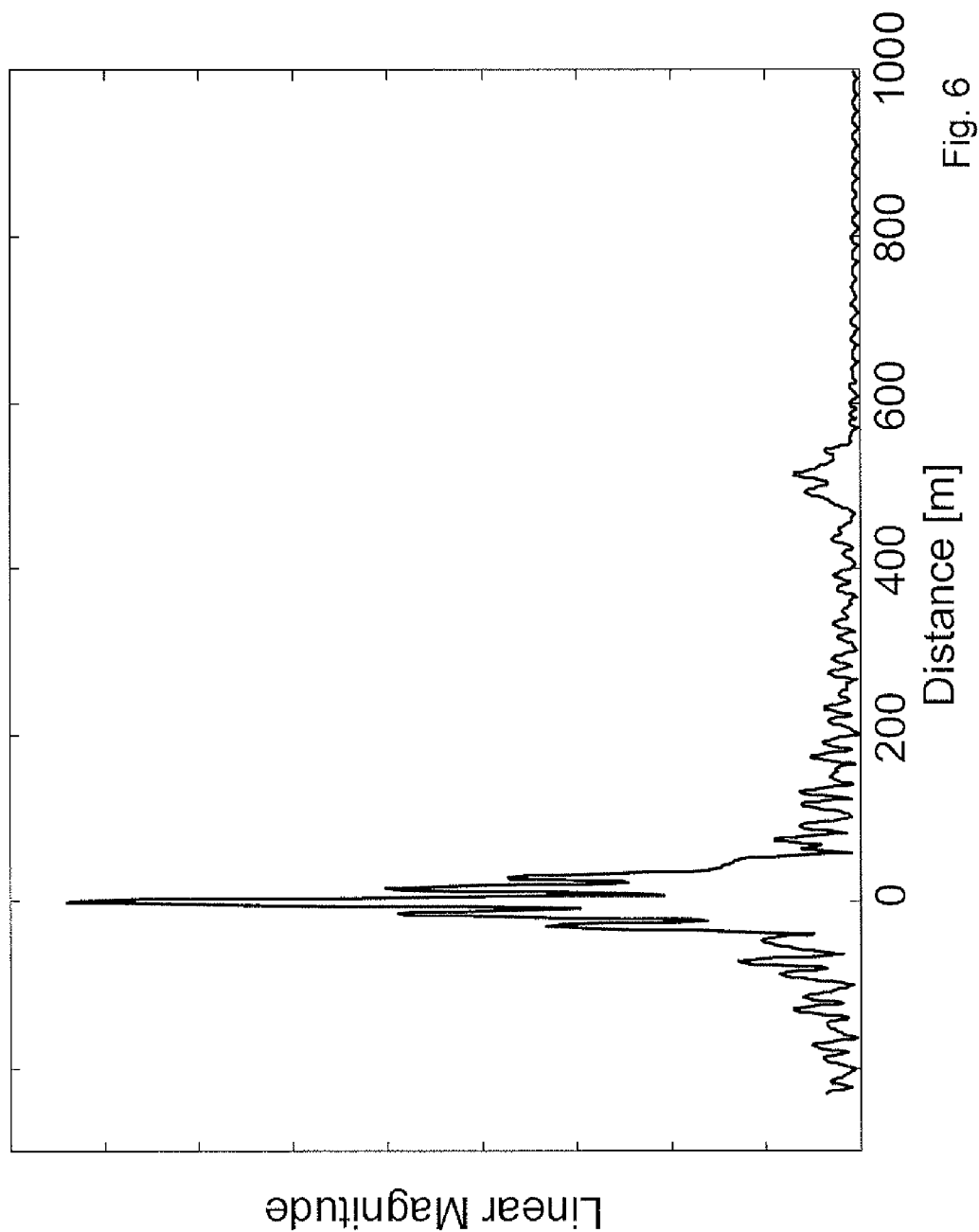
FIG. 6 shows a graph of echo vs. distance using all transmit bands and setting $S11(f)$ to zero in the receive bands.

To show that the receive band echo measurement really improves the result, we also tried to fill the gaps between the transmit bands with a constant value, e.g. set the echo to zero in those bands. This will keep noise levels low but instead, sidelobe levels will increase dramatically as seen in FIG. 6. The figure shows echo vs. distance using all transmit bands and setting S11(f) to zero in the receive bands. The bad splice at 50 meter distance cannot be seen due to the high sidelobe level of the near-end echo at 0 meter.

Figure 7:
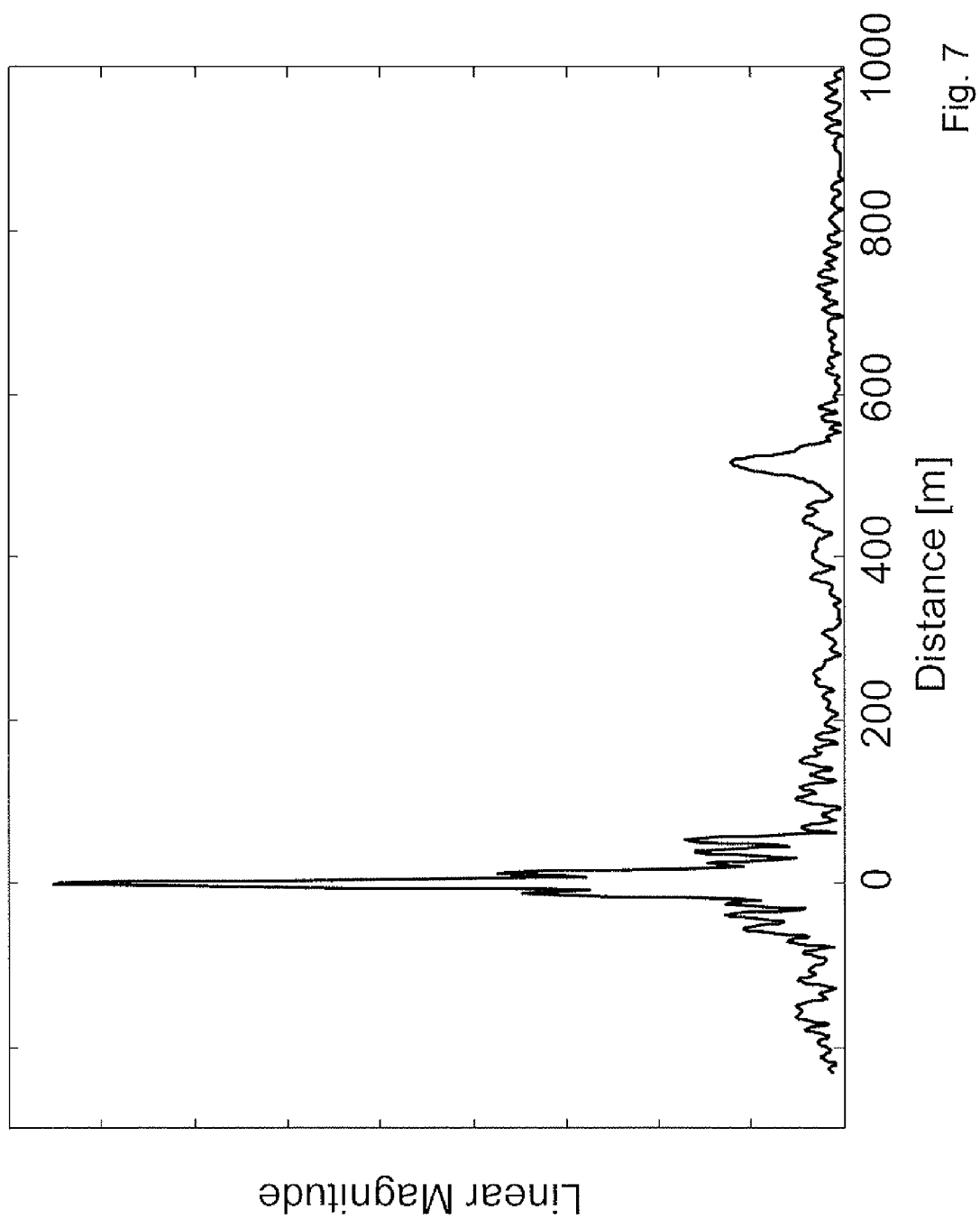
FIG. 7 shows a graph of echo vs. distance using the whole 17 MHz band including measurements on receive bands but with AGC errors in some receive bands.

The results so far assume either an ideal AGC or some method to properly scale echoes measured in different bands in order to form a continuous echo when concatenating the measured bands. If this is not the case, we can get results similar to FIG. 7 where all bands were measured but the echoes in two of the receive bands were multiplied by a random number corresponding to that AGC gains were not perfectly known. Here, the sidelobes will make it difficult to see the bad splice. FIG. 7 shows echo vs. distance using the whole 17 MHz band including measurements on receive bands but with AGC errors in some receive bands. The bad splice at 50 meter cannot be differentiated from the sidelobes.

Although the problem with AGC error was exaggerated in the example above, this problem is not unlikely given the large span of PSD levels between transmit and receive bands as shown in FIG. 1. Some solutions to this include:

- Measure without overlap (adjacent bands) and make sure that the measured echo response is continuous by proper scaling of the different bands
- Measure without overlap (adjacent bands) and use a polynomial or other data model to fit the measured data at the band edges and extrapolate towards the neighbor band to create an artificial overlap between bands at one or more frequencies.
- Make sure that the measured bands always overlap at least slightly and use this overlap to adjust scaling of the measurements with e.g. a least squares fitting
- Calibration of the different AGC levels in the receiver in order to improve the error between selected AGC level and actual AGC level.
- Using the same AGC setting for all measurements that should be concatenated to a single result (may result in bad utilization of the dynamic range of the receiver).

Figure 8:
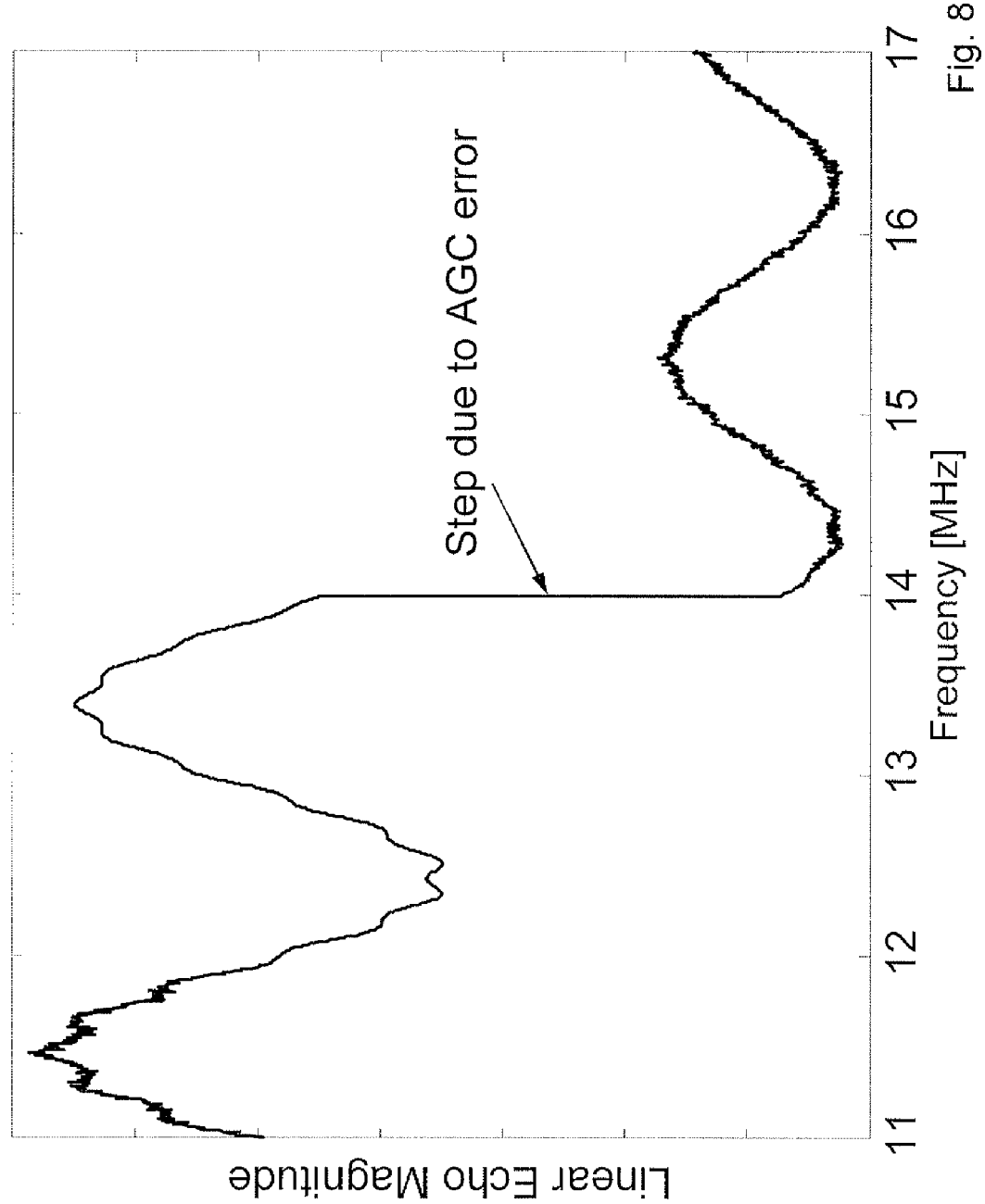
FIG. 8 shows a graph of a measured frequency domain echo with a step at the edge between two bands.

An example of how the problem looks in frequency domain is shown in FIG. 8 with a large step at 14 MHz where DS3 and US3 meet. The step was caused by insufficient calibration of the AGC.

Figure 9:
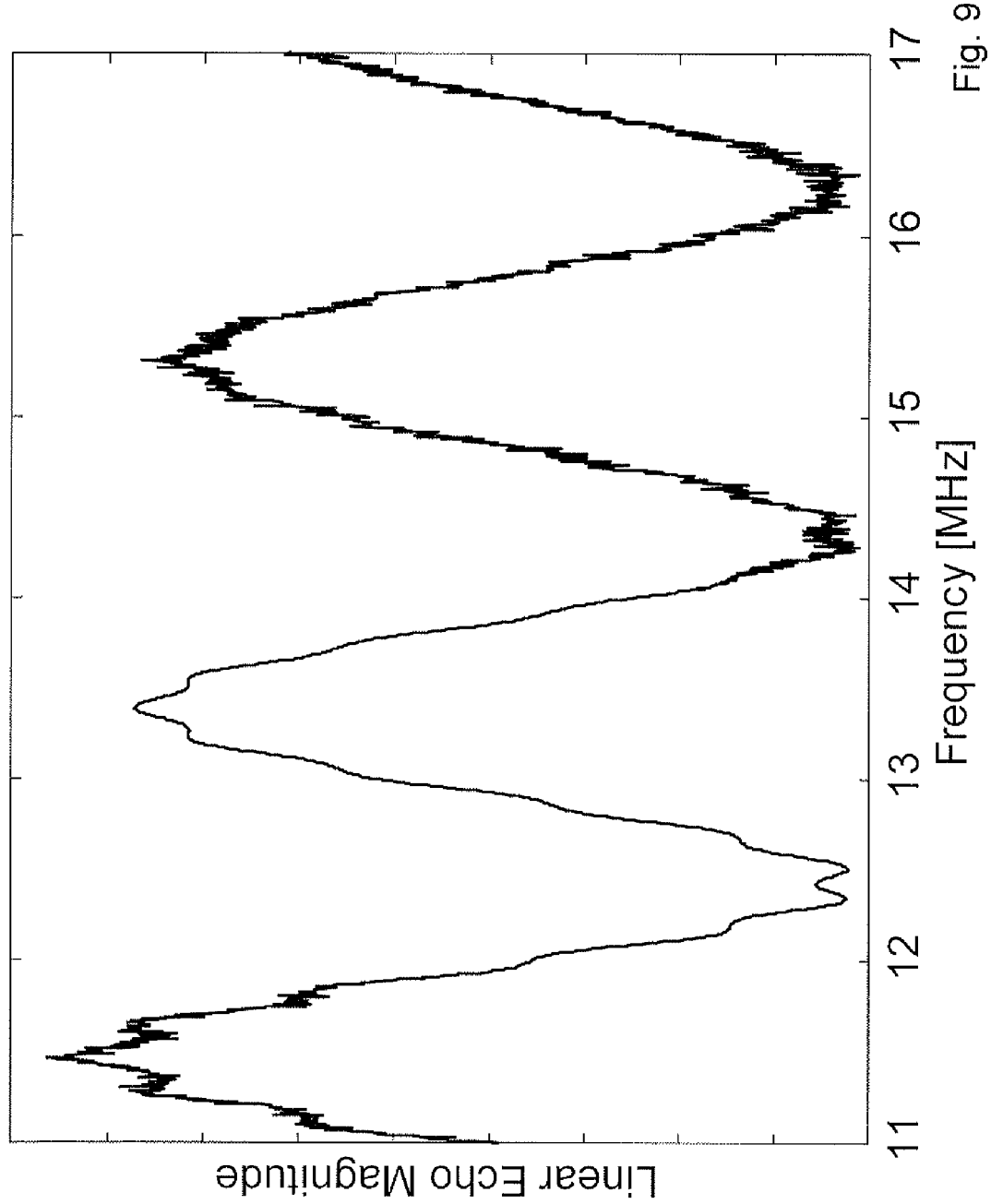
FIG. 9 shows a graph which displays how the step of FIG. 8 was corrected.

The result when US3 measurements are adjusted so that the Uncalibrated echo response (UER(f)) becomes continuous can be seen in FIG. 9, which shows the step corrected by adjusting the level of the echo response in the last band in order to get a smooth transition between bands, i.e. continuous UER(f).

A variant of measuring with overlap is to make a first measurement covering the whole range that the transceiver is capable of measuring, e.g. the full 17 or 30 MHz. (A smaller range is possible, but it should at least partly cover one stop band and one pass band)

The first measurement is preferably made with a flat PSD level which is the maximum allowed PSD in the band which has the lowest allowed PSD. I.e. the measurement uses the stop band allowed PSD, typically −100 dBm/Hz.

Further measurements are then made in the pass bands, using PSDs allowed in those bands.

Each of the further measurements are then scaled so as to produce a best fit between the further measurement result and the first measurement results for at least some, but preferably all of the frequencies that are present in both measurements.

Best fit may be by least squares or some other method.

A single concatenated echo frequency response result for the whole covered frequency range may be generated by simply discarding the parts of the low-power (e.g. low SNR) results that are within the region of overlap, and then concatenating the remaining data.

A more elaborate method is that the results of the first and second measurements for frequencies that are present in both measurements are combined using a weighted average, preferably with a high weight for the results with a high SNR, e.g. the pass band measurements, so as to create a single, concatenated echo frequency response result for the whole covered frequency range. This will reduce the influence of noise.

Further, in order to prevent discontinuities (e.g. caused by noise) at the edges of the region of overlap, the weights of the weighted average may be selected differently near the edges of the overlap region. At the edges to the low power measurement, the weight for that measurement is set to 1 (and the weight for the high power measurement is thus set to zero), and then the weights are gradually (for example linearly with frequency) changed into an SNR-based weighting when moving into the region of overlap.

In a variant where the high power measurements are not completely overlapped by low power measurements (e.g. the case where each stop band measurement covers the stop band and a little bit of each adjacent pass band), the region of overlap will have an edge to a low power measurement on one side and an edge to a high power measurement on the other side. In this case, the weight is preferably set to 1 for the low power measurement at the edge towards that measurement, and set to 1 for the high power measurement at the edge towards that measurement. In both cases, the weights are gradually changed into an SNR-based weighting when moving into the region of overlap.

In a variant, the weighting is changed linearly with frequency from 1-0 to 0-1 from edge to edge for the low-power and high-power results respectively. I.e. at the edge to the low-power measurement that measurement is used, and at the edge to the high-power measurement that measurement is used, and in between there is a gradual change from one to the other.

When an echo frequency response has been so obtained it may then be further used, for example to generate the line impulse response by inverse Fourier transform, as explained above.

Figure 10:
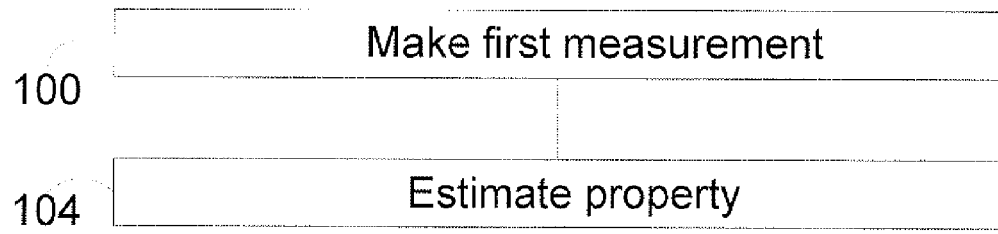
FIGS. 10 and 11 show flow charts of measurement methods.
Figure 11:
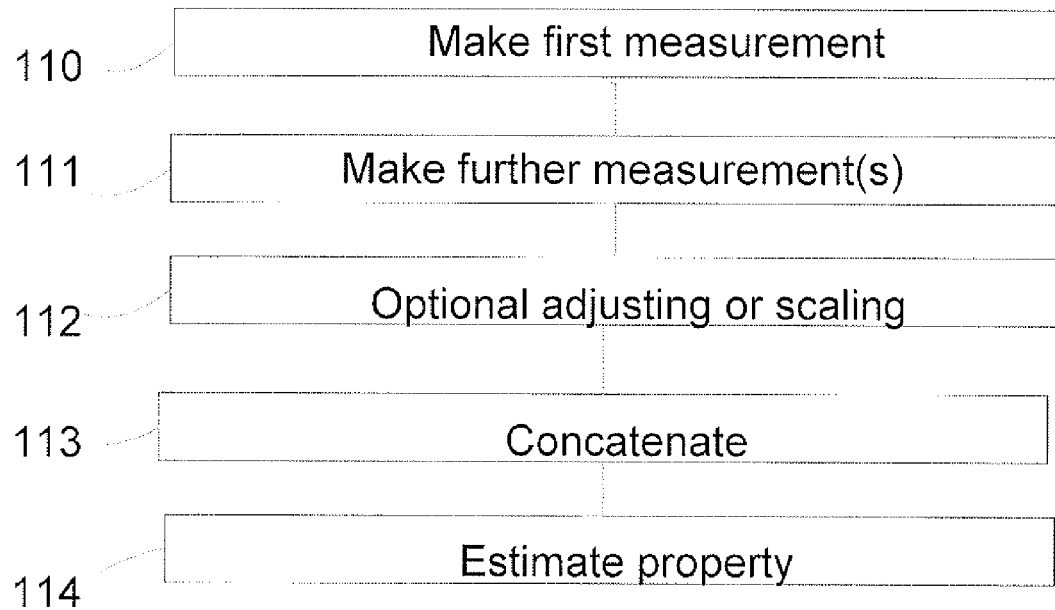

FIGS. 10 and 11 provide a further illustration of the measurement methods disclosed above.

In FIG. 10, in a step 100, a first FDR SELT measurement is made in a stop band. In a step 104, a line property is estimated from the measurement result. The line property may be the echo frequency response, or some other property such as the line impulse response or the position of a fault.

In FIG. 11, in a step 110, a first measurement is made in a stop band, as in step 100 of FIG. 10. In a step 111, one or more further measurements are made (which may or may not be in stop bands). In an optional step 112, measurement results are adjusted and/or scaled to fit smoothly to each other. In a step 113, measurement results are concatenated to form a single result. In a step 114, a line property is estimated from the single result.

Results

The multi-band technique can improve time resolution for a VDSL2 FDR SELT application about 5-10 times depending on the used band plan, provided that echoes from the different bands are properly scaled before concatenation. Typical resolution improvement will be 5-6 times while a resolution improvement of 10 would apply when using 30 MHz capable hardware on a 17 MHz bandplan with DS1 width of about 3 MHz. The improved resolution allows much more detailed information on problems on the transmission line, especially for problems close to the xTU performing the SELT. This is important since there is often a connector or cable splice within tens of meters from the DSLAM in the CO. If this connection degrades, the problem will be visible much earlier with this invention.

The importance of the invention will be even higher for SELT in street cabinets and other remote locations due to the Downstream Power Back Off (DPBO) function that has to be applied in these locations. DPBO is needed to protect xDSL lines originating in the CO from excessive crosstalk generated by equipment in remote locations. The PSD shaping applied in DPBO will effectively narrow the transmit bands thus decreasing resolution but this can be mitigated by the current invention. Further, the invention is not limited to SELT in an xTU-O but can also be used in e.g. xTU-R SELT (CPE SELT).

Such a CPE SELT could be utilized to examine whether or not a POTS/DSL splitter is present and, if there is no splitter, also to characterize the telephone lines (home wiring) inside the customer premises.

Abbreviations
ADSL Asymmetric Digital Subscriber Line
AGC Automatic Gain Control
CO Central Office
CPE Customer Premises Equipment
DPBO Downstream Power Back Off
FEXT Far-End Crosstalk
NEXT Near-End Crosstalk
PSD Power Spectral Density
FDR Frequency Domain Reflectometry
SELT Single Ended Line Test
SNR Signal-to-Noise Ratio
VDSL2 Very High Speed Digital Subscriber Line
xTU xDSL Transceiver Unit
xTU-O xTU at operator end of the loop (CO, cabinet etc.)
xTU-R xTU at remote end of the loop (subscriber side)

The invention claimed is:
1. A method in a Digital Subscriber Line (DSL) system for estimating a transmission property of a telecommunications transmission line, the method comprising the steps of:
  making a first frequency domain reflectometry Single Ended Line Testing (SELT) measurement which comprises the steps of:
    sending a first signal to the line;
    receiving a resulting second signal from the line; and
    estimating a property of the line in dependence of a relationship between the first signal and the second signal,
    wherein the first SELT measurement is made in a first stop band and in accordance or substantially in accordance with a Power Spectral Density (PSD) mask by which the first signal is sent in the first stop band of a DSL band plan, the first signal having a PSD in accordance or substantially in accordance with the PSD mask associated with the band plan and applicable to a particular setting where the sending of the first signal takes place,
  making a second frequency domain reflectometry SELT measurement in a first pass band adjacent to the first stop band, the measurement comprising sending a second signal to the line;
  concatenating results of the first and second SELT measurements to form a single measurement result over a contiguous frequency range comprising the whole or at least parts of the frequency ranges of the first and second SELT measurements, wherein the first and second SELT measurements are made in an xTU-O or an xTU-R, and wherein the power of the second signal sent for the second SELT measurement is several orders of magnitude greater than the power of the first signal sent for the first SELT measurement.

2. A method according to claim 1 wherein the first signal has a PSD in accordance with the PSD mask.

3. A method according to claim 1 wherein the first and second SELT measurements are performed separately.

4. A method according to claim 3 wherein the PSD of the second signal sent for the second measurement is the maximum allowed for the band in which it is sent, according to the PSD mask of the band plan, or it is the maximum according to regulatory limits which specify a lower PSD than the PSD mask of the band plan.

5. A method according to claim 1 wherein edge regions of individual measurement results are adapted to corresponding edge regions of adjacent measurement results to create a continuous concatenated measurement.

6. A method according to claim 5 wherein the adaption is made using least squares fitting.

7. A method according to claim 1 wherein each individual SELT measurement result is scaled using a scaling factor so as to fit smoothly to each adjacent measurement result.

8. A method according to claim 7 wherein the scaling factors for the individual SELT measurements are selected using a least squares fitting.

9. A method according to claim 1 wherein SELT measurements are made in several stop bands and several pass bands, and the measurement results are concatenated to form the single measurement result.

10. A method according to claim 1 wherein several SELT measurements are made and concatenated so as to cover substantially the whole of the frequency range of which a transmitter used for sending the signals is capable of covering.

11. A method according to claim 1 which is used in VDSL2 bands other than US0.

12. A method according to claim 1 wherein the first SELT measurement covers a frequency range which partly or wholly covers at least one stop band and at least one pass band.

13. A method according to claim 12 wherein:
one or more further SELT measurements are made in the at least one pass band; and
each one of the further SELT measurement results is scaled so as to provide a best fit between the one of the further SELT measurement results and the first measurement result for frequencies which are present in the measurement results of both measurements.

14. A method according to claim 12, wherein the power of the part of the second signal sent in the pass band is several orders of magnitude greater than the power of the part of the first signal sent in the stop band.

* * * * *

UNITED STATES PATENT AND TRADEMARK OFFICE
CERTIFICATE OF CORRECTION

PATENT NO.       : 8,385,510 B2
APPLICATION NO.  : 13/129555
DATED            : February 26, 2013
INVENTOR(S)      : Berg et al.

Page 1 of 1

It is certified that error appears in the above-identified patent and that said Letters Patent is hereby corrected as shown below:

In the Specifications:

In Column 7, Line 13, delete "$R_1(f)$" and insert -- $R_i(f)$ --, therefor.

Signed and Sealed this
Eighteenth Day of June, 2013

Teresa Stanek Rea
*Acting Director of the United States Patent and Trademark Office*